United States Patent
Shur et al.

(10) Patent No.: US 7,955,882 B2
(45) Date of Patent: Jun. 7, 2011

(54) METHOD OF RADIATION GENERATION AND MANIPULATION

(75) Inventors: Michael Shur, Latham, NY (US); Victor Ryzhii, Aizu-Wakamatsu (JP); Remigijus Gaska, Columbia, SC (US)

(73) Assignee: Sensor Electronic Technology, Inc., Columbia, SC (US)

( * ) Notice: Subject to any disclaimer, the term of this patent is extended or adjusted under 35 U.S.C. 154(b) by 0 days.

(21) Appl. No.: 12/619,758

(22) Filed: Nov. 17, 2009

(65) Prior Publication Data
US 2010/0059792 A1 Mar. 11, 2010

Related U.S. Application Data

(63) Continuation of application No. 10/696,693, filed on Oct. 29, 2003, now Pat. No. 7,619,263.

(60) Provisional application No. 60/461,100, filed on Apr. 8, 2003.

(51) Int. Cl.
*H01L 21/00* (2006.01)
(52) U.S. Cl. .................................................. 438/47
(58) Field of Classification Search .................. 257/22, 257/198, E29.246
See application file for complete search history.

(56) References Cited

U.S. PATENT DOCUMENTS

| | | | |
|---|---|---|---|
| 4,236,124 A | 11/1980 | Rockwood | |
| 4,989,052 A | 1/1991 | Okada et al. | |
| 5,371,388 A | 12/1994 | Oda | |
| 5,468,972 A | 11/1995 | Yamada | |
| 5,705,847 A | 1/1998 | Kashiwa et al. | |
| 5,729,017 A | 3/1998 | Brener et al. | |
| 5,767,969 A | 6/1998 | Chevalier | |
| 6,178,275 B1 | 1/2001 | Nerses et al. | |
| 6,269,199 B1 | 7/2001 | Maloney | |
| 6,720,589 B1 | 4/2004 | Shields | |
| 2003/0016716 A1 | 1/2003 | Mahonty | |
| 2004/0188703 A1 | 9/2004 | Cheng et al. | |

OTHER PUBLICATIONS

Shur et al., "Novel heterodimensional diodes and transistors", Solid-State Electronics, vol. 38, Issue 9, Sep. 1995, pp. 1727-1730.*
M.J.W. Rodwell, "Preface: High Speed Integrated Circuit Technology, Towards 100 GHz Logic", International Journal of High Speed Electronics and Systems, vol. 11, No. 1, 2 pages, Mar. 2001.
Dyakonov et al., "Plasma Wave Electronics: Novel Terahertz Devices Using Two Dimensional Electron Fluid", IEEE Transactions on Electron Devices, vol. 43, No. 10, pp. 1640-1645, Oct. 1996.
Dyakonov et al., "Plasma Wave Electronics for Terahertz Applications", pp. 187-207, in "Terahertz Sources and Systems", R.E. Miles, P. Harrison and D. Lippens, Editors, NATO Science Series, II, Matehmatics, Physics and Chemistry, vol. 27, Kluwer Academic Publishers, Dordrecht, Boston, and London 2001, pp. 1-21.

(Continued)

*Primary Examiner* — Thomas L Dickey
(74) *Attorney, Agent, or Firm* — John W. LaBatt; Hoffman Warnick LLC

(57) ABSTRACT

A method of managing radiation having a frequency in the terahertz and/or microwave regions. The method comprises providing a semiconducting device having a two-dimensional carrier gas. Plasma waves are generated in the carrier gas using a laser pulse. The frequency of the plasma waves, and as a result, the generated radiation are adjusted using a voltage applied to the semiconducting device.

19 Claims, 8 Drawing Sheets

OTHER PUBLICATIONS

Shur et al., "Two Dimensional Electrons in Field Effect Transistors", International Journal of High Speed Electronics and Systems, vol. 9, No. 1, pp. 65-99, Mar. 1998, pp. 1-34.

Ryzhii et al., "Resonant Detection and Frequency Multiplication of Terahertz Radiation Utilizing Plasma Waves in Resonant-Tunneling Transistors", Journal of Applied Physics, vol. 88, No. 5, pp. 2868-2871, Sep. 1, 2000.

Ryzhii et al., "Terahertz Photomixing in Quantum Well Structures Using Resonant Excitation of Plasma Oscillations", Journal of Applied Physics, vol. 91, No. 4, pp. 1875-1881, Feb. 15, 2002.

Shur et al., "Ballistic Transport in Semiconductor at Low Temperatures for Low-Power High-Speed Logic", IEEE Transactions on Electron Devices, vol. Ed-26, No. 11, pp. 1677-1683, Nov. 1979.

Timp et al., "The Ballistic Nano-Transistor", IEDM Technical Digest, pp. 55-58, 1999.

Kawaura et al., "Transistor Characteristics of 14-nm-Gate-Length EJ-Mosfets's", IEEE Transactions on Electron Devices, vol. 47, No. 4, pp. 856-860, Apr. 2000.

Kastalsky et al., "Conductance of Small Semiconductor Devices", Solid State Comm., vol. 39, No. 6, 715, 1981, pp. 107-114.

Lee et al., "Impedance of Thin Semiconductor Films in Low Electric Field", Journal of Applied Physics, vol. 54, No. 7, pp. 4028-4034, Jul. 1983.

Dyakonov et al., "Ballistic Transport in High Mobility Semiconductors", The Physics of Semiconductors Ed. by M. Scheffler and R. Zimmermann, World Scientific, pp. 145-148, Singapore, 1996, pp. 1-4.

Michael S. Shur, "Low Ballistic Mobility in Submicron High Electron Mobility Transistors", IEEE, EDL, vol. 23, No. 9, pp. 511-513, Sep. 2002, pp. 1-12.

Michael S. Shur, "Ballistic Transport in a Semiconductor with Collisions", IEEE Transactions on Electron Devices, vol. ED-28, No. 10, pp. 1120-1130, Oct. 1981.

Dyakonov et al., "Detection, Mixing, and Frequency Multiplication of Terahertz Radiation by Two-Dimensional Electronic Fluid", IEEE Transactions on Electron Devices, vol. 43, No. 3, pp. 380-387, Mar. 1996.

Dyakonov et al., "Shallow Water Analogy for a Ballistic Field Effect Transistor: New Mechanism of Plasma Wave Generation by dc Current", Physical Review Letters, vol. 71, No. 15, pp. 2465-2468, Oct. 11, 1993.

Shur et al., "Plasma Wave Electronics", Terahertz Sensing Technology, vol. 1: Electronic Devices and Advanced Technology, 2003, pp. 1-26.

A. V. Chaplik, "Possible Crystallization of Charge Carriers in Low-Density Inversion Layers", Soviet Physics JETP, vol. 35, No. 2, pp. 395-397, Aug. 1972.

Masatoshi Nakayama, "Theory of Surface Waves Coupled to Surface Carriers", Journal of the Physical Society of Japan, vol. 36, No. 2, pp. 393-398, Feb. 1974.

Allen et al., "Observation of the Two-Dimensional Plasmon in Silicon Inversion Layers", Physical Review Letters, vol. 38, No. 17, pp. 980-983, Apr. 25, 1977.

Tsui et al., "Far Infrared Emission from Plasma Oscillations of Si Inversion Layers", Solid State Communications, vol. 35, pp. 875-877, 1980.

Burke et al., "High Frequency Conductivity of the High-Mobility Two-Dimensional Electron Gas", Applied Physics Letters, vol. 76, No. 6, pp. 745-747, Feb. 7, 2000.

Lu et al., "Resonant Terahertz Dector Utilizing a High Electron Mobility Transistor", IEDM, 1998, pp. 453-456.

Knap et al., "Resonant Detection of Subterahertz Radiation by Plasma Waves in a Submicron Field-Effect Transistor", Applied Physics Letters, vol. 80, No. 18, pp. 3433-3435, May 6, 2002.

Peralta et al., "Terahertz Photoconductivity and Plasmon Modes in Double-Quantum-Well Field-Effect Transistors", Applied Physics Letters, vol. 81, No. 9, pp. 1627-1629, Aug. 26, 2002.

Dyakonov et al., "Ballistic FET as Tunable Terahertz Oscillator", Proceedings of 2nd International Semiconductor Device Research Symposium, Charlottesville, VA, pp. 741-744, Dec. 1993.

Crowe et al., "Terahertz GaAs Devices and Circuits for Heterodyne Receiver Applications", in Compound Semiconductor Electronics, The Age of Maturity, Editor Michael Shur, World Scientific, Selected Topics in Electronics and Systems, vol. 4, pp. 209-245, 1996.

Ferguson et al., "Materials for Terahertz Science and Technology", Nature Materials, vol. 1, pp. 26-33, Sep. 2002.

Peatman et al., "A Novel Schottky/2-DEG Diode for Millimeter- and Submillimeter- Wave Multiplier Applications", IEEE Electron Device Letters, vol. 13, No. 1, pp. 11-13, Jan. 1992.

Peatman et al., "A Schottky/2-DEG Varactor Diode for Milimeter and Submillimeter Wave Multiplier Applications", The Third International Conference on Space THz Technology, Ann Arbor, MI., pp. 93-109, Mar. 24-26, 1992, pp. 1-17.

K. T. Tsen, "Ultrafast Physical Processes in Semicondutors", Semiconductors and Semimetals, vol. 67, pp. 390-440, 2001.

Peatman et al., "Narrow Channel 2-D Mesfet for Low Power Electronics", IEEE Transactions on Electron Devices, vol. 42, No. 9, pp. 1569-1573, Sep. 1995.

Shur et al., "Novel Heterodimensional Diodes and Transistors", Solid-State Electronics, vol. 38, No. 9, pp. 1727-1730, 1995.

Hurt et al., "Comparison of 2-D and 3-D Side-gated FETs", Proceedings of International Semiconductor Device Research Symposium, vol. 1, pp. 79-82, Charlottesville, VA, ISBN 1-88092-04-4, Dec. 1995.

New York Times, nytimes.com, "Trying to Put New Zip in to Moore's Law", http://www.nytimes.com/2008/02/24/business/24proto.html, Feb. 24, 2008.

compoundsemiconductor.net, "New Record for Stimulated Emission in Al GaN/AlN", http://compoundsemconductor.net/cws/article/news/16457, Nov. 25, 2002.

Sohn et al., "Tunable Terahertz Generation Using Femtosecond Pulse Shaping", Applied Physics Letters, vol. 81, No. 1, pp. 13-15, Jul. 1, 2002.

Jo Ann McDonald, "Pioneering the Blue Spectrum", Compound SemiNews, Jun. 11, 2003.

Sarukura et al., "Submilliwatt, Short-Pulse, Terahertz Radiation from Femtosecond-laser Irradiated InAs in a Magnetic Field", Lasers and Electro-Optics, 1998, CLEO 98, Technical Digest: Summaries of Papers Presented at the Conference on May 3-8, 1998, p. 63.

Nabet et al., "Heterojunction and Heterodimensional Devices for Optoelectronics", Microwave Magazine, IEEE, vol. 2, Issue 1, pp. 40-45, Mar. 2001.

Muller et al., "Device Electronics for Integrated Circuits", p. 257, John Wiley & Sons, New York, 1977.

Hurt et al., "Heterodimensional Device Technologies", pp. 35-38, Compound Semiconductor Mar./Apr. 1997.

Office Action, U.S. Appl. No. 10/696,693, Dated Jun. 17, 2004, 9 pages.

Office Action, U.S. Appl. No. 10/696,693, Dated Sep. 23, 2004, 5 pages.

Office Action, U.S. Appl. No. 10/696,693, Dated Dec. 3, 2004, 5 pages.

Final Office Action, U.S. Appl. No. 10/696,693, Dated Apr. 6, 2005, 5 pages.

Office Action, U.S. Appl. No. 10/696,693, Dated Jul. 12, 2005, 6 pages.

Office Action, U.S. Appl. No. 10/696,693, Dated Dec. 28, 2005, 5 pages.

Office Action, U.S. Appl. No. 10/696,693, Dated Apr. 10, 2006, 5 pages.

Office Action, U.S. Appl. No. 10/696,693, Dated Sep. 22, 2006, 5 pages.

Office Action, U.S. Appl. No. 10/696,693, Dated Jan. 18, 2007, 6 pages.

Office Action, U.S. Appl. No. 10/696,693, Dated Sep. 28, 2007, 33 pages.

Final Office Action, U.S. Appl. No. 10/696,693, Dated Apr. 23, 2008, 45 pages.

Office Action, U.S. Appl. No. 10/696,693, Dated Sep. 12, 2008, 27 pages.
Final Office Action, U.S. Appl. No. 10/696,693, Dated Apr. 22, 2009, 34 pages.

Notice of Allowance, U.S. Appl. No. 10/696,693, Dated Jul. 8, 2009, 4 pages.

* cited by examiner

METHOD OF RADIATION GENERATION AND MANIPULATION

REFERENCE TO PRIOR APPLICATIONS

The current application is a continuation of U.S. patent application Ser. No. 10/696,693, filed on Oct. 29, 2003 and issued as U.S. Pat. No. 7,619,263, which claims priority to provisional application Ser. No. 60/461,100, filed on Apr. 8, 2003, both of which are incorporated herein by reference.

BACKGROUND OF THE INVENTION

1. Technical Field

The invention relates generally to the generation and manipulation of radiation, and more specifically to a method of managing radiation using a semiconducting device.

2. Related Art

Currently, neither electronic nor photonic devices generate radiation having a frequency within the terahertz range. As a result, this range of frequencies is often called the "terahertz gap." For example, the upper frequency that can be attained using electronic transistors is limited by the transit time of carriers under the gate (for a field effect transistor) or across the base and collector depletion region (for a bipolar junction transistor). While the feature sizes of these devices can be scaled to obtain device parameters close to the terahertz gap (i.e., frequencies of a few hundred gigahertz), fundamental physics limitations, such as the size of the gate length versus the wave length of the terahertz radiation, lead to diminishing returns provided by further scaling. Photonic devices have been created that approach the terahertz gap using interband or intersubband transitions. However, these devices must operate at cryogenic temperatures due to the smaller quanta of terahertz radiation versus thermal energy at room and liquid nitrogen temperatures.

As an alternative approach, plasma waves have been used to generate radiation in the terahertz gap. Plasma waves are oscillations of electron density in time and space. The properties of plasma waves are dependent on the electron density and the dimension and geometry of the electronic system. In a gated two-dimensional electron gas, for example, the velocity of the plasma waves is proportional to the square root of the electron sheet density. In deep submicron field effect transistors, typical plasma waves have frequencies in the terahertz range and do not involve any quantum transitions. Further, the electron transit time may become smaller than the electron momentum relaxation time, causing the electron transport to approach a ballistic mode of transport.

Devices having a ballistic mode of transport exhibit two characteristics. In low electric fields, the effective electron mobility in short channel (i.e., submicron) devices may be substantially smaller than the electron mobility in long channel devices. In high electric fields, electron velocity is higher than in a collision dominated device, and the bulk plasma oscillations may lead to space oscillations of the electron density. When the plasma frequency multiplied by the electron momentum relaxation time is greater than one, a channel of a field effect transistor can act as a resonant cavity for the plasma waves. However, current devices have been unable to overcome the electron energy loss in a ballistic device due to the contacts of the device.

As a result, a need exists for a method of generating and manipulating radiation using a semiconducting device that allows for a larger gate length and/or successfully overcomes the electron energy loss due to the contacts of the device.

SUMMARY OF THE INVENTION

The invention provides a method of managing radiation using a semiconducting device. In particular, radiation having a frequency in the microwave and/or terahertz ranges can be generated, adjusted, and/or detected by adjusting a voltage applied to the semiconducting device. The semiconducting device has an active layer that includes a two-dimensional carrier gas (electron or hole) that is excited using a laser pulse. The laser pulse can be shone on the semiconducting device at various locations. The laser pulse excites a plasma wave in the two-dimensional carrier gas that generates radiation. Characteristics of the two-dimensional carrier gas are modified by adjusting the applied voltage, which in turn adjusts the frequency of the radiation generated by the device. The frequency of the radiation can further be adjusted by modifying various physical parameters of the semiconducting device.

A first aspect of the invention provides a method of managing radiation, the method comprising: providing a semiconducting device having a two-dimensional carrier gas; exciting the carrier gas using a laser pulse having a duration of approximately one to three hundred femtoseconds; and adjusting a frequency of the radiation using a voltage applied to the semiconducting device.

A second aspect of the invention provides a method of generating radiation using a field effect transistor, the method comprising: shining a laser pulse onto the field effect transistor; and adjusting a frequency of the radiation by adjusting a carrier density of carriers in a channel of the field effect transistor.

A third aspect of the invention provides a method of generating radiation using a heterodimensional diode, the method comprising: shining a laser pulse onto at least one of a top side and a bottom side of the heterodimensional diode; and adjusting a frequency of the radiation using a voltage applied to the heterodimensional diode.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

It is understood, that for purposes of this description Al means Aluminum, Ga means Gallium, N means Nitrogen, In means Indium, Si means Silicon, O means Oxygen, C means Carbon, As means Arsenic, Li means Lithium, Nb means Niobium, Ge means Germanium, Sb means Antimony, and P means Phosphorus. Further, it is understood that "group III elements" comprise the elements Al, Ga, In, Boron (B), and Thallium (Tl), and "group IV elements" comprise the elements C, Si, Ge, Tin (Sn), and Lead (Pb). Still further, it is understood that "terahertz radiation" comprises radiation having a frequency between approximately 0.1 and 100 terahertz ($10^{12}$ hertz), and "microwave radiation" comprises radiation having a frequency between approximately 1 and 100 gigahertz ($10^9$ hertz).

The invention provides a method of managing radiation using a semiconducting device. In particular, radiation having a frequency in the microwave and/or terahertz ranges can be generated, adjusted, and/or detected by adjusting a voltage applied to the semiconducting device. The semiconducting device has an active layer that includes a two-dimensional carrier gas (electron or hole) that is excited using a laser pulse. The laser pulse can be shone on the semiconducting device at various locations. The laser pulse excites a plasma wave in the two-dimensional carrier gas that generates radiation. Characteristics of the two-dimensional carrier gas are modified by adjusting the applied voltage, which in turn adjusts the frequency of the radiation generated by the device. The frequency of the radiation can further be adjusted by modifying various physical parameters of the semiconducting device.

Figure 1:
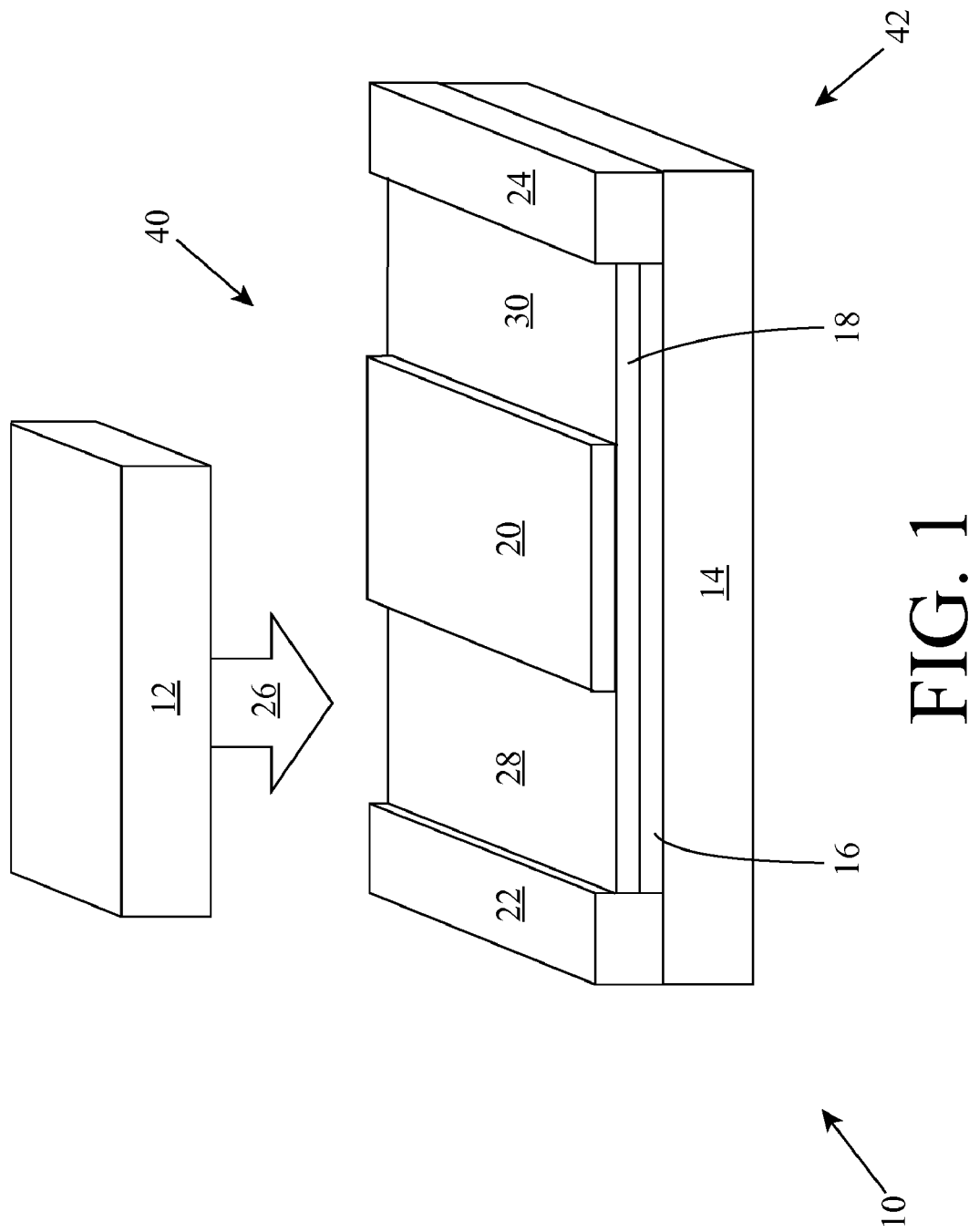
FIG. 1 shows an illustrative embodiment of a field effect transistor having a laser pulse shone onto a gate-source spacing according to one aspect of the invention.

Turning to the Figures, FIG. 1 shows a semiconducting device 10 and a laser 12. Device 10 is configured to operate as a field effect transistor, and includes a substrate 14, an active layer 16, a barrier layer 18, a gate 20, a source contact 22, and a drain contact 24. Device 10 includes a "top" side 40 and an opposing "bottom" side 42. Top side 40 comprises the side of device 10 that includes gate 20 and/or one or more contacts 22, 24, while bottom side 42 comprises the side of device 10 that is closer to substrate 14, opposite the side that includes gate 20 and/or contacts 22, 24. In one embodiment, device 10 comprises a GaAs-based high electron mobility transistor (HEMT) in which substrate 14 comprises p-type GaAs, active layer 15 comprises an epitaxial GaAs layer, and barrier layer 18 comprises AlGaAs. Further, gate 20 can comprise a 0.1 micrometer ($10^{-6}$ meters) gate, and a gate-to-source and a gate-to-drain spacing can comprise one micrometer each. Device 10 can be manufactured using any approach now known or later developed, and may include one or more additional layers and/or contacts not shown.

It is understood that device 10 can include any type of substrate 14. For example, substrate 14 can comprise GaAs, InP, sapphire, SiC, spinel, silicon, bulk GaN, bulk AlN, bulk AlGaN, $LiGaO_2$, $LiNbO_3$, or the like. Active layer 16 can comprise an active layer having a two-dimensional carrier gas (electron or hole). As such, active layer 16 can comprise any compound capable of including the two-dimensional carrier gas, including, for example, Si, SiGe, Ge, AlGaAs, GaAs, AlN, GaN, InN, AlInAs, InSb, InP, etc. Barrier layer 18 can also comprise any compound capable of insulating active layer 16 from gate 20, including, for example, $SiO_2$, SiN, a binary, ternary, or quaternary compound that includes one, two, or three group III elements, respectively, and N or a group IV element, a compound that includes elements of groups II and VI, or a combination of layers of different compositions.

Figure 2:
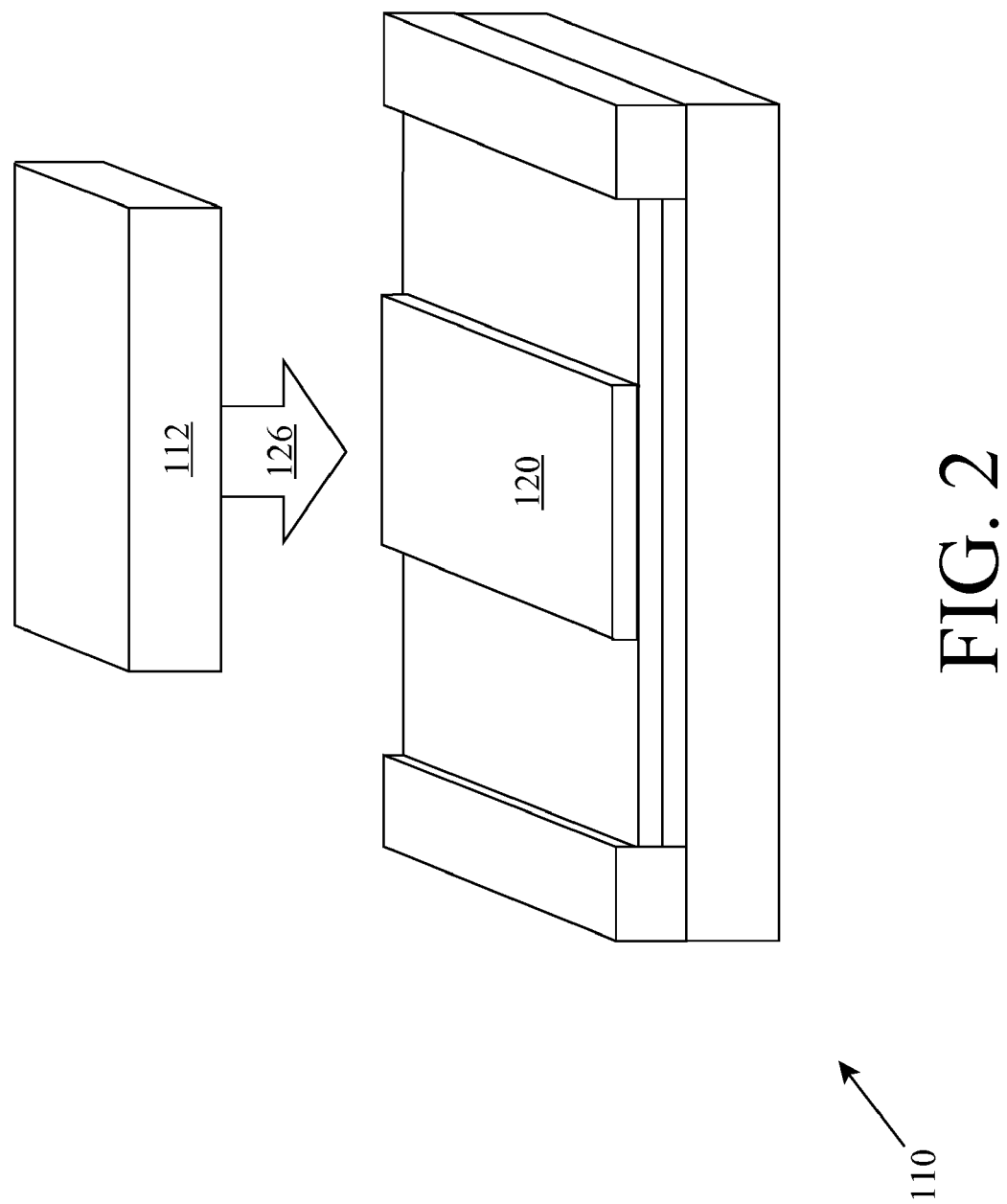
FIG. 2 shows an alternative embodiment of a field effect transistor having a laser pulse shone onto a gate.
Figure 3:
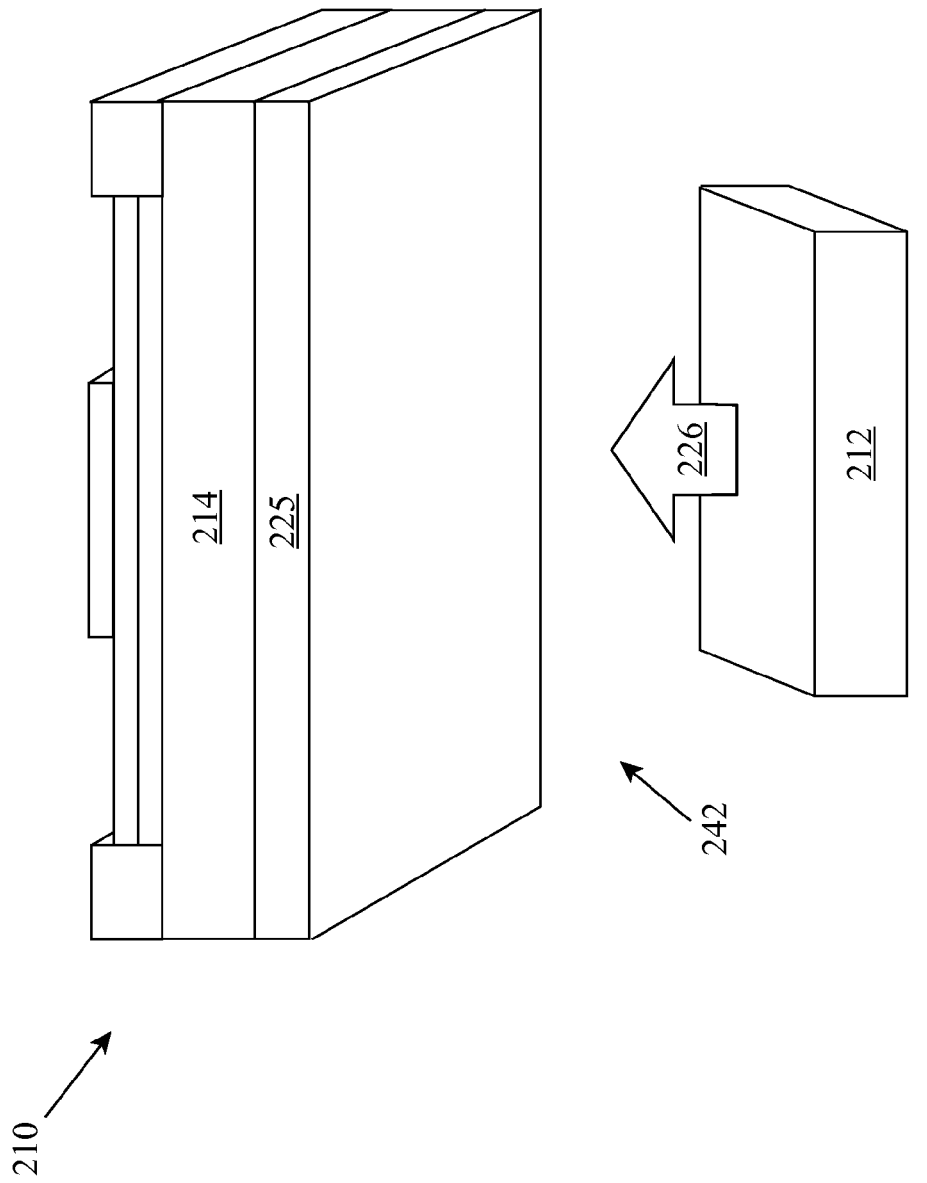
FIG. 3 shows another alternative embodiment of a field effect transistor having a laser pulse shone onto a substrate.

Laser 12 generates a laser pulse 26 that excites the carrier gas in device 10. In one embodiment, laser pulse 26 has a duration of approximately twenty femtoseconds and a photon energy that exceeds 1.42 electron Volts (eV). However, it is understood that the duration of laser pulse 26 can vary within a range of approximately one femtosecond to approximately ten picoseconds. Laser 12 is shown positioned so that laser pulse 26 shines onto top side 40 of device 10, and in particular, on a gate-source spacing 28 of barrier layer 18. Alternatively, laser pulse 26 can be shone onto a gate-drain spacing 30 of barrier layer 18 on device 10, or simultaneously shone onto both gate-source spacing 28 and gate drain spacing 30. Further, FIG. 2 shows a laser 112 that is positioned to shine a laser pulse 126 onto a gate 120 of a device 110. In this embodiment, gate 120 can comprise a material that allows laser pulse 126 to pass through it (i.e., is transparent). FIG. 3 shows yet another alternative embodiment, in which a laser 212 is positioned to shine a laser pulse 226 onto bottom side 242 of device 210. As shown, device 210 can include a substrate contact 225 onto which laser pulse 226 is shown. Alternatively, laser pulse 226 could be shown directly on substrate 214. It is understood that one or more lasers can be used simultaneously or alternatively to excite the carrier gas in the device. As a result, the invention is not limited to the configuration and/or number of lasers shown and discussed in the illustrative embodiments.

Returning to FIG. 1, laser pulse 26 has a photon energy that is sufficient to cause a band-to-band or impurity-to-band transition, e.g., in excess of 1.42 eV, thereby abruptly changing the conductivity of the illuminated region(s) of device 10. This results in exciting plasma oscillations in device 10. Active layer 16 serves as a resonant cavity that traps these plasma oscillations as plasma waves. This contrasts with conventional approaches in which a femtosecond laser pulse is used to excite a semiconductor leading to the generation of broadband radiation. In any event the resulting radiation can have a frequency in the microwave range, the terahertz range, or both.

The frequency and/or amplitude of the radiation can be manipulated using various methods. For example, when device 10 includes a gate 20, the frequency of the plasma waves is proportional to the length of gate 20. Further, the frequency of the plasma waves is also proportional to the square root of a carrier density in the active layer 16 (i.e., channel). In an re-channel transistor, the carriers comprise electrons, while in a p-channel transistor, the carriers comprise holes. In either case, since the carrier density can be adjusted by applying a voltage to device 10, the frequency of the plasma waves is also approximately proportional to the square root of the voltage difference between a threshold voltage and a voltage applied to gate 20. In other words, changing the bias voltage at gate 20 and/or the length of gate 20 adjusts the frequency of the plasma waves which also adjusts the frequency of the radiation.

The frequency and/or amplitude of the radiation can also be manipulated by adjusting a voltage applied to device 10. For example, adjusting a bias of the voltage applied to drain contact 24 of device 10 also alters the propagation and boundary conditions for the plasma waves. Changes to the propagation and boundary conditions for the plasma waves result in changes to the amplitude and frequency of the radiation generated by device 10. Consequently, adjusting the bias of the voltage applied to drain contact 24 also adjusts the frequency and amplitude of the radiation generated by device 10.

Figure 4:
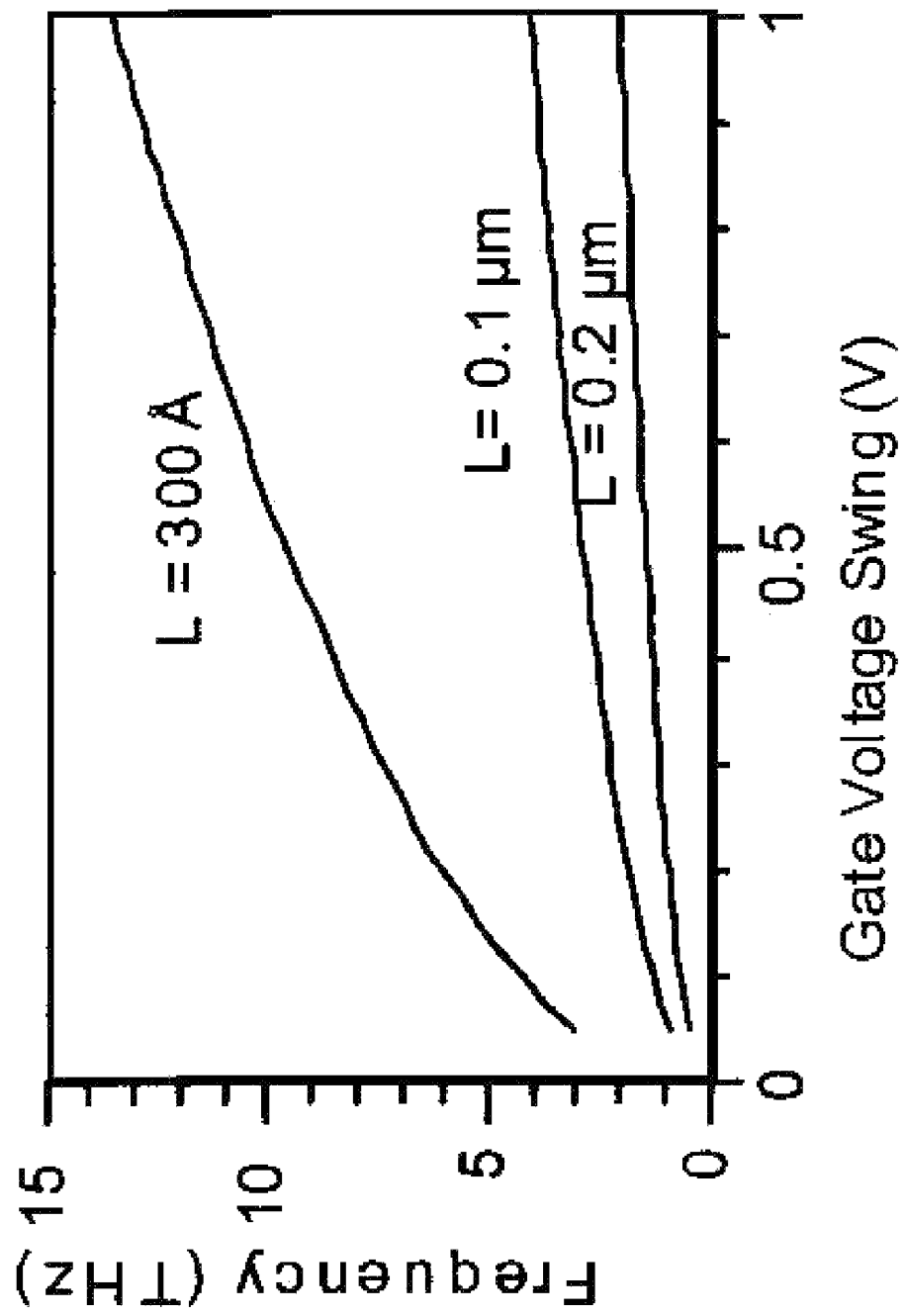
FIG. 4 shows the frequency of the plasma waves as a function of bias voltage for various field effect transistors configured as shown in FIG. 1 and having different gate lengths.

The relationship between gate length, bias voltage, and plasma wave frequency is shown in FIG. 4. In FIG. 4, plasma wave frequency (vertical) is plotted as a function of bias voltage (horizontal) for various field effect transistors configured as shown in FIG. 1. Each field effect transistor included an active layer comprising GaAs, and a barrier layer comprising AlGaAs and had a unique gate length (L). The field effect transistors had gates having lengths of 0.2 micrometers, 0.1 micrometers, and 300 Angstroms ($10^{-10}$ meters). A bias voltage was applied to the gate in each field effect transistor, and the frequency of the plasma waves was measured. As can be seen in FIG. 4, a shorter gate length yielded a higher plasma frequency, and a higher bias voltage (i.e., gate voltage swing) also yielded a higher plasma frequency.

Figure 5:
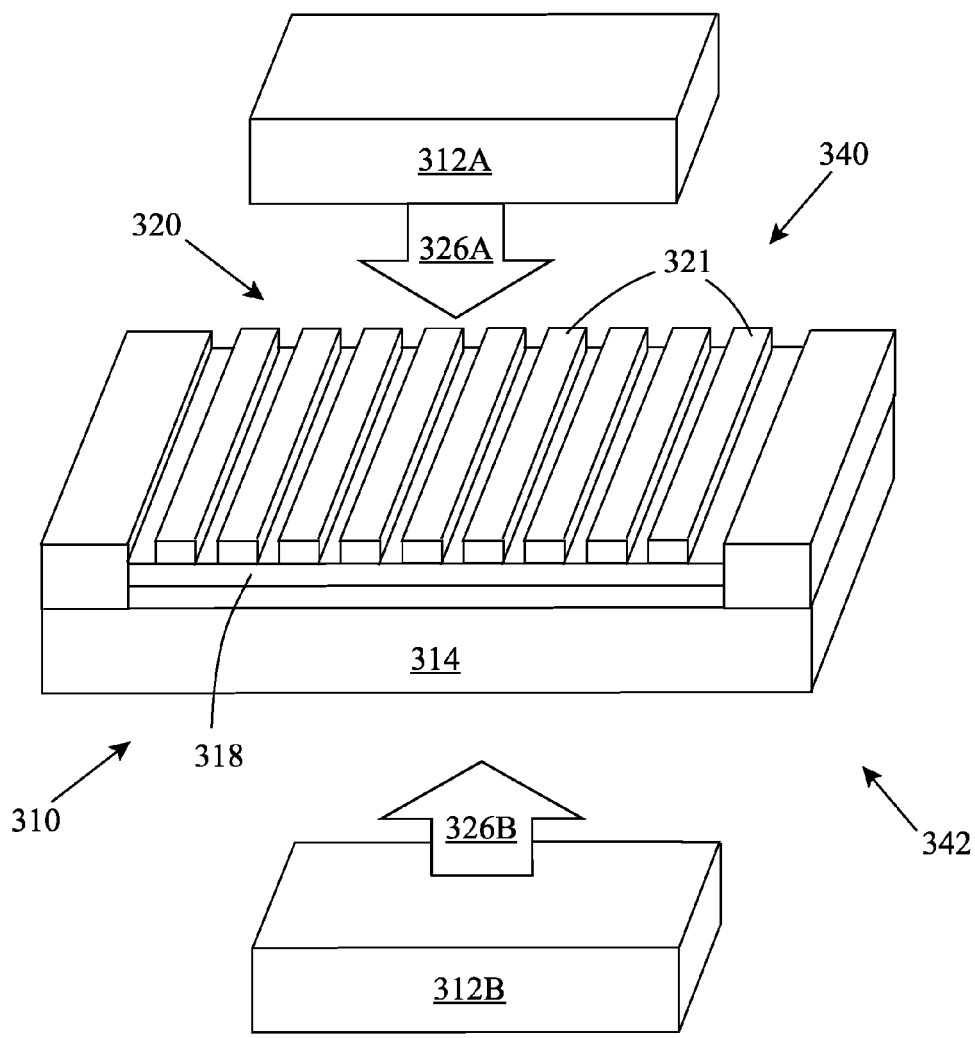
FIG. 5 shows yet another alternative embodiment of a field effect transistor having a periodic grating gate and being illuminated by two lasers.

FIG. 5 shows an alternative embodiment in which device 310 comprises a field effect transistor having a periodic grating gate 320. Periodic grating gate 320 comprises a plurality of gate fingers 321 disposed on a barrier layer 318. Device 310 is illuminated by two lasers 312A, 312B disposed to shine onto a top side 340 and bottom side 342 of device 310, respectively. In particular, laser 312A is disposed to emit a pulse 326A of laser radiation onto periodic grating gate 320 and barrier layer 318, and laser 312B is disposed to emit a pulse 326B of laser radiation onto a substrate 314 of device 310. In this embodiment, the frequency of the plasma waves is proportional to the length of each gate finger 321. Use of periodic grating gate 320 allows the size of device 310 to be comparable to the wavelength of the terahertz and/or microwave radiation, which allows device 310 to generate the radiation in a more efficient manner.

Figure 6:
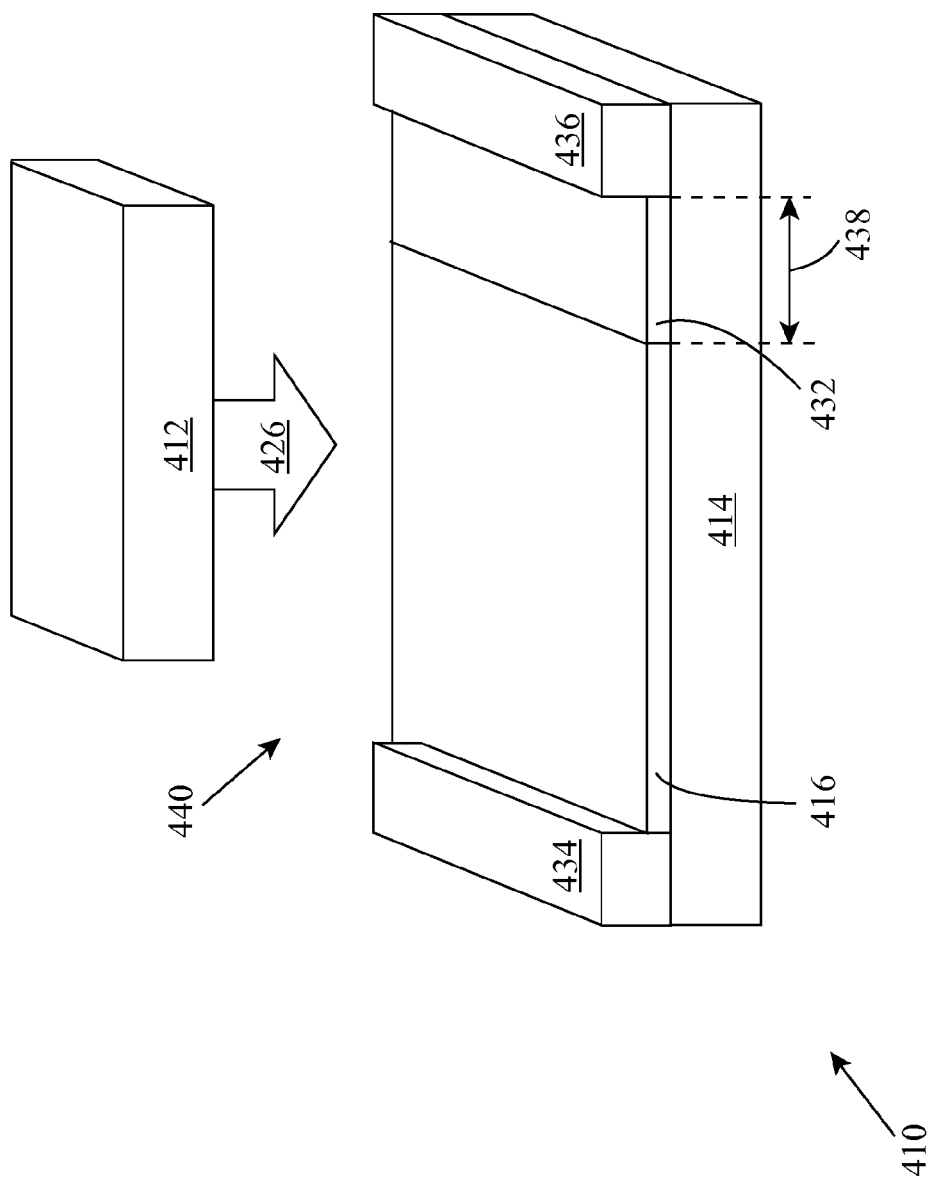
FIG. 6 shows an illustrative embodiment of a heterodimensional diode according to one aspect of the invention.

FIG. 6 shows an alternative embodiment in which device 410 comprises a heterodimensional diode. The heterodimensional diode comprises a substrate 414, and an ungated active layer 416. Active layer 416 includes a two-dimensional carrier gas (electron or hole), and is bounded by a contact on one side and a second contact on another side. In this case, active layer 416 is bounded by an ohmic contact 434, and a rectifying contact 436. In one embodiment, device 10 comprises a GaAs-based heterodimensional diode in which substrate 414 comprises a GaAs substrate and active layer 416 comprises a GaAs epitaxial layer. Further, device 410 can include a 0.25 micrometer spacing between contacts 434, 436. Rectifying contact 436 can comprise a Schottky contact or any contact that forms a p-n junction with the two-dimensional carrier gas in active layer 416 resulting in the formation of a depletion region 432 in active layer 416. Laser 412 is shown configured to shine a laser pulse 426 onto a top side 440 of device 410, and in particular, active layer 416. In this embodiment, the frequency of the plasma waves and, as a result, the frequency of the radiation can be adjusted by adjusting a width 438 of depletion region 432. Width 438 of depletion region 432 is proportional to the difference between a bias voltage applied to rectifying contact 436 and a constant voltage that is dependent on the physical properties of rectifying contact 436. As a result, changing the bias voltage applied to rectifying contact 436 adjusts the frequency of the radiation.

Figure 7:
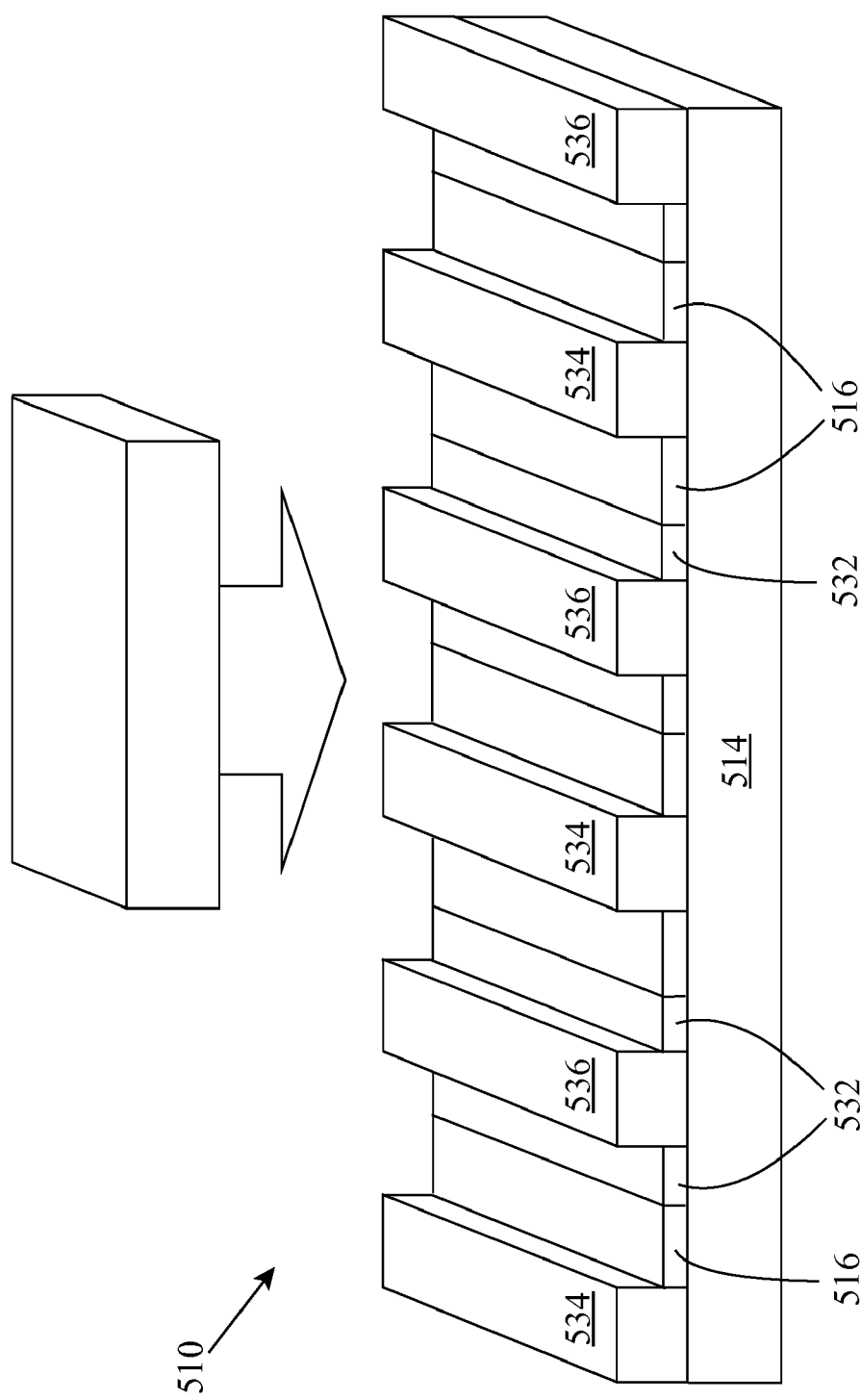
FIG. 7 shows an illustrative embodiment of an array of heterodimensional diodes according to another aspect of the invention.

FIG. 7 shows an illustrative embodiment of a device 510 configured as an array of heterodimensional diodes in which ohmic contacts 534 and rectifying contacts 536 are placed in alternating positions on substrate 514. As a result, a plurality of active layers 516 are formed that are each bounded by an ohmic contact 534 and a rectifying contact 536. As discussed previously with reference to FIG. 6, each rectifying contact 536 forms a depletion region 532 in a portion of the active layer 516 that is closest to the rectifying contact 536. A width of the depletion region 532 is adjusted by adjusting a bias voltage applied to each rectifying contact 436. This results in an adjustment to the frequency of the radiation.

Figure 8:
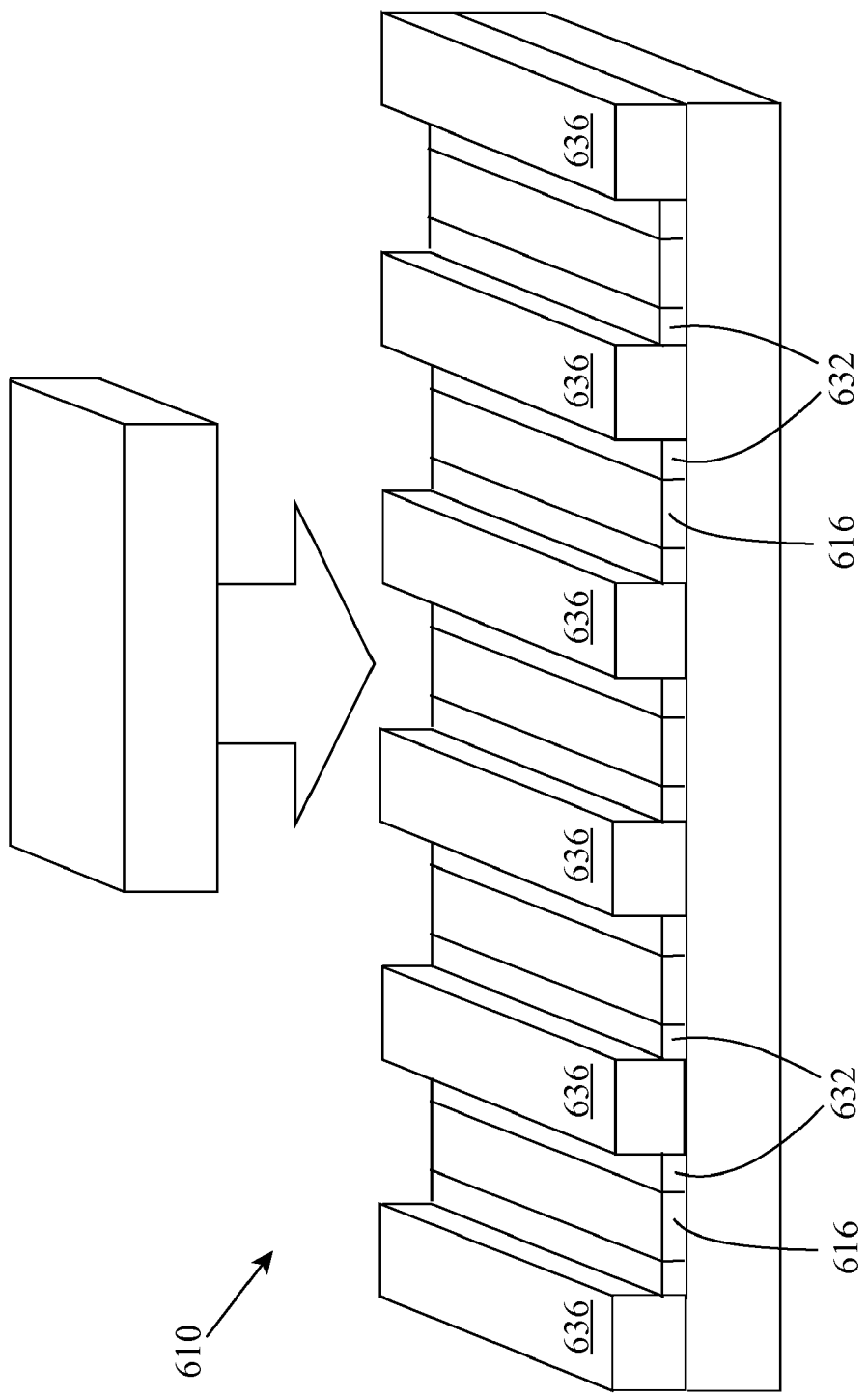
FIG. 8 shows an alternative embodiment of an array of heterodimensional diodes according to yet another aspect of the invention.

FIG. 8 shows yet another illustrative embodiment of a device 610 configured as an array of heterodimensional diodes in which a plurality of active layers 616 are bounded on two sides by rectifying contacts 636. Although both device 510 (FIG. 7) and device 610 comprise the same number of contacts, similar adjustments in a bias voltage applied to the rectifying contacts 636 of device 610 result in greater adjustments to the frequency of the radiation compared to device 510 since additional depletion regions 632 are formed in active layers 616.

When an array of devices (i.e., diodes, field effect transistors, etc.) is used, it is understood that the same voltage can be applied to the various contacts or two or more different voltages can be applied to the various contacts. While the arrays of devices are shown having a particular number and configuration of contacts, it is understood that these are presented for illustrative purposes only. A device can include any number and/or configuration of contacts according to the invention.

While various aspects of the invention have been discussed in terms of generating radiation having a desired frequency, the teachings of the invention are not limited to generating radiation, but apply to all aspects of managing radiation. For example, it is understood that the teachings of the invention can readily be applied to detecting, mixing, and/or frequency multiplication of radiation having a particular frequency. In order to implement one of these applications, it may be necessary to subject the semiconductor device to electromagnetic radiation from a local oscillator.

The foregoing description of various embodiments of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of generating terahertz radiation, the method comprising:
    selecting a bias voltage for a semiconducting device based on a desired frequency of the terahertz radiation, wherein the semiconducting device comprises an array of heterodimensional diodes;
    applying the bias voltage between at least one of: a plurality of ohmic contacts and a plurality of rectifying contacts placed in alternating positions on the semiconducting device or adjacent contacts of a plurality of pairs of rectifying contacts placed on the semiconducting device;
    generating laser pulses with a laser; and
    shining the laser pulses directly onto the semiconducting device during the applying, wherein the shining causes the carrier gas of the semiconducting device to emit terahertz radiation having the desired frequency.

2. The method of claim 1, further comprising adjusting the applied bias voltage, wherein the adjusting alters at least one of: an amplitude or a frequency of the terahertz radiation.

3. The method of claim 1, wherein the selecting is further based on at least one attribute of the semiconducting device.

4. The method of claim 1, wherein the bias voltage is applied between the plurality of ohmic contacts and the plurality of rectifying contacts placed in alternating positions on the semiconducting device.

5. The method of claim 1, wherein the bias voltage is applied between the adjacent contacts of the plurality of pairs of rectifying contacts placed on the semiconducting device.

6. The method of claim 1, further comprising adjusting the frequency of the terahertz radiation by adjusting the applied bias voltage.

7. The method of claim 1, wherein each of the array of heterodimensional diodes comprises a gallium arsenide-based heterodimensional diode.

8. A method of generating terahertz radiation, the method comprising:
    selecting a bias voltage based on a desired frequency of the terahertz radiation;
    applying the bias voltage between a first contact of a field effect transistor and a plurality of gate fingers of a periodic grating gate to a two-dimensional carrier gas of the field effect transistor;
    generating laser pulses with a first laser;
    shining the laser pulses directly onto a first side of the field effect transistor during the applying, wherein the shining causes the carrier gas of the field effect transistor to emit terahertz radiation having the desired frequency;
    generating laser pulses with a second laser, distinct from the first laser; and
    shining the laser pulses generated with the second laser directly onto a second side of the field effect transistor opposite the first side.

9. The method of claim 8, further comprising selecting a length of each gate finger based on the desired frequency of the terahertz radiation.

10. The method of claim 8, wherein the field effect transistor comprises a gallium arsenide-based high electron mobility transistor (HEMT).

11. The method of claim 8, further comprising adjusting the frequency of the terahertz radiation by adjusting the applied bias voltage.

12. The method of claim 8, wherein the selecting is further based on at least one attribute of the semiconducting device.

13. The method of claim 12, wherein the at least one attribute comprises a length of a periodic grating gate to the two-dimensional gas for the semiconducting device.

14. A method of generating terahertz radiation, the method comprising:
    selecting a bias voltage based on a desired frequency of the terahertz radiation;
    applying the bias voltage between a first contact and a second contact for each of a plurality of heterodimensional diodes in an array of heterodimensional diodes formed on a single substrate, wherein at least one of: the plurality of heterodimensional diodes are formed by alternating ohmic and rectifying contacts or the first contact and the second contact each comprise a rectifying contact;
    generating laser pulses with a laser; and
    shining the laser pulses directly onto the array of heterodimensional diodes during the applying, wherein the shining causes the carrier gas of the array of heterodimensional diodes to emit terahertz radiation having the desired frequency.

15. The method of claim 14, wherein the plurality of heterodimensional diodes are formed by the alternating ohmic and rectifying contacts.

16. The method of claim 14, wherein the first contact and the second contact each comprise the rectifying contact.

17. The method of claim 14, further comprising adjusting the frequency of the terahertz radiation by adjusting the applied bias voltage.

18. The method of claim 14, wherein each of the plurality of heterodimensional diodes comprises a gallium arsenide-based heterodimensional diode.

19. The method of claim 14, wherein the selecting is further based on at least one attribute of the array of heterodimensional diodes.

* * * * *